United States Patent
Kawano et al.

(10) Patent No.: US 8,107,349 B2
(45) Date of Patent: Jan. 31, 2012

(54) OPTICAL HEAD DEVICE AND OPTICAL RECORDING AND READING SYSTEM

(75) Inventors: Noriyuki Kawano, Tokyo (JP); Tetsuya Nishiyama, Tokyo (JP); Yoshinori Sato, Tokyo (JP); Koji Mishima, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 233 days.

(21) Appl. No.: 12/585,378

(22) Filed: Sep. 14, 2009

(65) Prior Publication Data

US 2010/0103799 A1   Apr. 29, 2010

(30) Foreign Application Priority Data

Oct. 24, 2008  (JP) .................................. 2008-274717

(51) Int. Cl.
*G11B 7/00*   (2006.01)
(52) U.S. Cl. .............................. 369/112.23; 369/112.24
(58) Field of Classification Search ............. 369/112.23, 369/112.24
See application file for complete search history.

(56) References Cited

U.S. PATENT DOCUMENTS 5,724,334 A * 3/1998 Ohba et al. ............... 369/112.16
6,961,291 B2 * 11/2005 Getreuer et al. ........... 369/44.24

FOREIGN PATENT DOCUMENTS

JP    A 8-185640    7/1996

* cited by examiner

*Primary Examiner* — Latanya Bibbins
(74) *Attorney, Agent, or Firm* — Oliff & Berridge, PLC

(57) ABSTRACT

An optical head device (optical head) for a multi-layered optical recording medium has a focus control mechanism that makes use of astigmatism. The focus control mechanism has a sensor lens that includes a cylindrical lens. The focus control mechanism causes a light beam having passed through the sensor lens to have astigmatism, thereby being focused linearly in the Y direction on a front focal line located closer to the sensor lens and focused linearly in the X direction at a rear focal line located farther therefrom. The optical head also includes a photodetector which is disposed between the front focal line and the rear focal line to detect a focal position from the shape of a light beam. At the position of the front focal line, a shield plate with a window portion is disposed. The window portion has a size so as to allow the focal line to pass therethrough and shield stray light reflected from an unfocused recording layer.

12 Claims, 10 Drawing Sheets

OPTICAL HEAD DEVICE AND OPTICAL RECORDING AND READING SYSTEM

BACKGROUND OF THE INVENTION

1. Field of the Invention

The present invention relates to an optical head device for recording and reading information on a multi-layered optical recording medium having a plurality of recording layers, and to an optical recording and reading system which includes the optical head device.

2. Description of the Related Art

In Japanese Patent Application Laid-Open No. Hei 8-185640, there is disclosed an optical pickup device for use with 2-layer optical discs which accurately detects a servo signal and performs control operations without fail.

The optical pickup device includes: a photodetector for receiving a reflected beam from a two-layer optical disc; a first focusing lens disposed between the photodetector and a beam splitter with an optical axis of the first focusing lens aligned therewith; a light shield plate for shielding a reflected beam from an unfocused information signal layer; and a second focusing lens. The optical pickup device is configured to prevent the reflected beam from the unfocused information signal layer, i.e., inter-layer stray light from reaching the photodetector in order to detect the servo signal with accuracy.

However, with the optical pickup device disclosed in Japanese Patent Application Laid-Open No. Hei 8-185640 mentioned above, it was difficult to adjust the position of the light shield plate, i.e., a pin hole plate for shielding a reflected beam from an unfocused information signal layer. Additionally, a large distance between the two focusing lenses leads to an increase in the size of the optical pickup device. The use of focusing lenses also disadvantageously increases the number of parts required.

The inventor has found, as a result of intensive studies, that shielding with a shield plate at the front focal line position of an astigmatic optical element used greatly reduces adverse effects the inter-layer stray light had, even by the shielding at a position substantially away outwardly from the center of the reflected light beam.

SUMMARY OF THE INVENTION

In view of the foregoing problems, various exemplary embodiments of this invention provide an optical head device and a recording and reading system for a multi-layered optical recording medium, which are capable of reducing interlayer stray light and providing accurate focus control and tracking control without employing a pin hole whose position is difficult to adjust or two focusing lenses leading to an increase in size of the entire system.

In summary, the above-described objectives are achieved by the following embodiments of the present invention.

(1) An optical head device, comprising: a laser light source for producing a light beam; an objective lens for focusing the light beam from the laser light source on an optical recording medium and for receiving its reflected beam or a reflected light beam; an astigmatic optical element for causing the reflected light beam having passed through the objective lens to have astigmatism and thereby focus along a line in a Y direction at a near front focal line position and along a line in an X direction at a far rear focal line position, the reflected light beam having an optical axis in a Z direction, the X direction and the Y direction being orthogonal to each other in a plane perpendicular to the Z direction; and a photodetector for detecting a focus position of the objective lens from a shape of the reflected light beam, the photodetector being disposed between the front focal line position and the rear focal line position, wherein a shield plate for shielding both outer sides in a direction of width orthogonal to a longitudinal direction on a cross section of the reflected light beam at the front focal line position is disposed at the front focal line position.

(2) The optical head device according to (1), wherein the shield plate is designed to shield both outer sides at most 10 D in the direction of width, where D is a beam width or $1/e^2$ of a peak value of a relative radiation strength distribution curve which shows a relationship between an optical strength and a position in the direction of width orthogonal to the longitudinal direction on the cross section of the reflected light beam at the front focal line position.

(3) The optical head device according to (1) or (2), wherein the front focal line is located at distance s from a light-receiving face of the photodetector towards the astigmatic optical element, and s is approximately equal to $d \times M^2$, where d is a peak-to-peak distance of an S-shaped curve obtained by a relationship between a focus error signal provided by allowing the reflected light beam to be incident on the photodetector and a focal distance of the objective lens, and M is a return path magnification of an optical system from the objective lens to the light-receiving face of the photodetector.

(4) The optical head device according to (1), (2), or (3), wherein: the shield plate has a window portion through which a reflected light beam passes, the window portion being elongated in the longitudinal direction on the cross section of the reflected light beam at the front focal line position; and the photodetector has four light-receiving elements of the same shape disposed to be symmetrical vertically and horizontally, where the vertical direction is defined to be at 45 degrees to the X direction and the Y direction, the photodetector being designed to output, as a detection signal, a difference between respective sums of outputs from two diagonal pairs of these light-receiving elements, and the window portion is disposed to have a longitudinal direction thereof aligned with the Y direction.

(5) The optical head device according to (1) or (2), wherein: further comprising a diffraction grating which is configured to split the light beam emitted from the laser light source as a diverging beam into one main light beam and two sub light beams, the photodetector has a main light beam receiver and two sub light beam receivers disposed equidistantly in the X direction and Y direction with respect to the main light beam receiver; the main light beam receiver includes light-receiving elements disposed in four sections adjacent vertically and horizontally, where the vertical direction is at 45 degrees to the X direction and the Y direction, the main light beam receiver being configured to output, as a detection signal, a difference between respective sums of outputs from two diagonal pairs of light-receiving elements; the sub light beam receiver has light-receiving elements disposed either in four sections adjacent to each other vertically and horizontally or two sections adjacent to each other vertically; the shield plate has a window portion through which a reflected light beam passes, the window portion being elongated in the longitudinal direction on the cross section of the reflected light beam at the front focal line position; the window portion includes a main window and sub windows; and the main window is disposed to have a longitudinal direction thereof aligned with the Y direction, the sub windows being disposed at the front focal line positions of the sub light beams in parallel to the main window.

(6) The optical head device according to (5), wherein a width in a direction orthogonal to the longitudinal direction of the main window is greater than a width of the sub window.

(7) An optical recoding and reading system comprising: an optical recording medium including a plurality of recording layers; and the optical head device according to any one of (1) to (6), wherein the optical head device allows the objective lens to effect focusing on the recording layer based on an output signal from the photodetector.

DETAILED DESCRIPTION OF THE PREFERRED EMBODIMENTS

A description will now be made to an optical head device according to an exemplary embodiment of the present invention and a recording and reading system for multi-layered optical recording medium with the optical head device.

First Exemplary Embodiment

Figure 1:
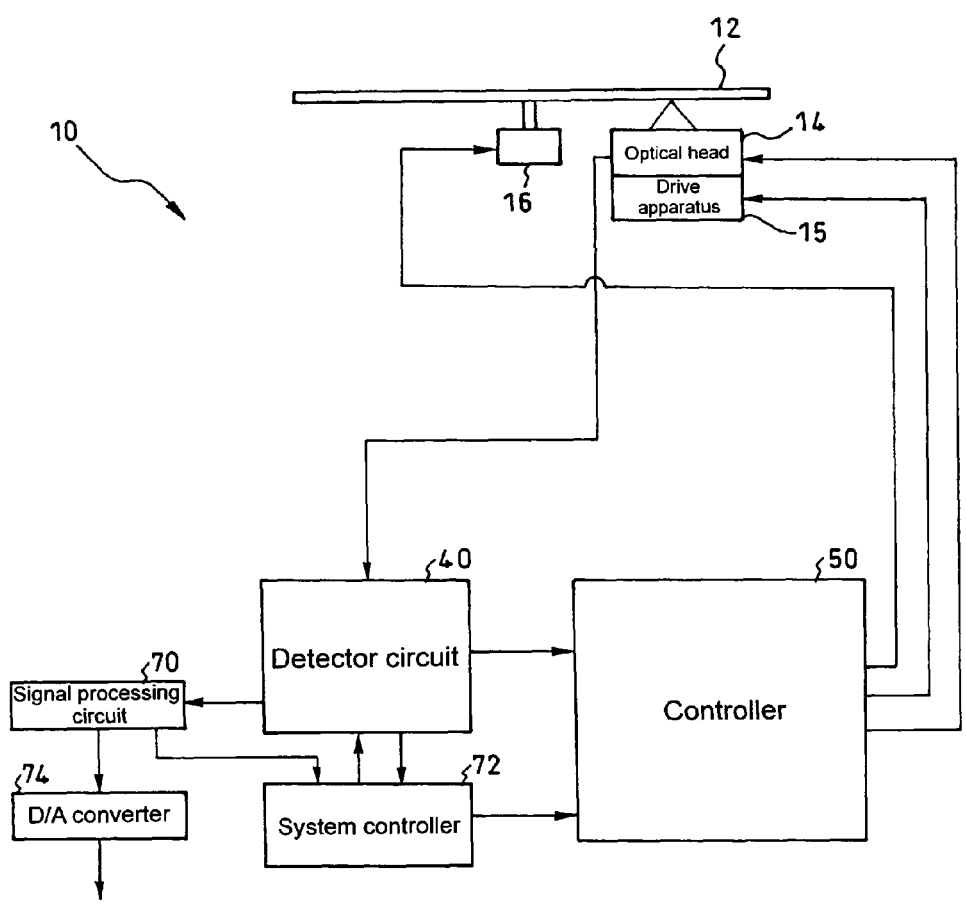
FIG. 1 is a block diagram illustrating a recording and reading system for a multi-layered optical recording medium with an optical head device according to an exemplary embodiment of the present invention.

As shown in FIG. 1, a recording and reading system for multi-layered optical recording medium (hereinafter referred to as the recording and reading system) 10 according to a first exemplary embodiment includes: a multi-layered optical recording medium 12; an optical head device (hereinafter referred to as an optical head) 14; a detector circuit 40 for outputting a reproduction (RF) signal, a tracking error (TE) signal, a focus error (FE) signal, and other signals based on a signal from the optical head 14; a controller 50; a signal process circuit 70 for reading a reference clock and determining an address in the RF signal from the detector circuit 40; a system controller 72; and a D/A converter 74. The controller 50 controls the optical head 14, a drive apparatus 15 for driving the optical head 14 in the radial direction of the multi-layered optical recording medium 12, and a spindle motor 16 for rotationally driving the multi-layered optical recording medium 12, based on an output signal from the detector circuit 40.

Figure 2:
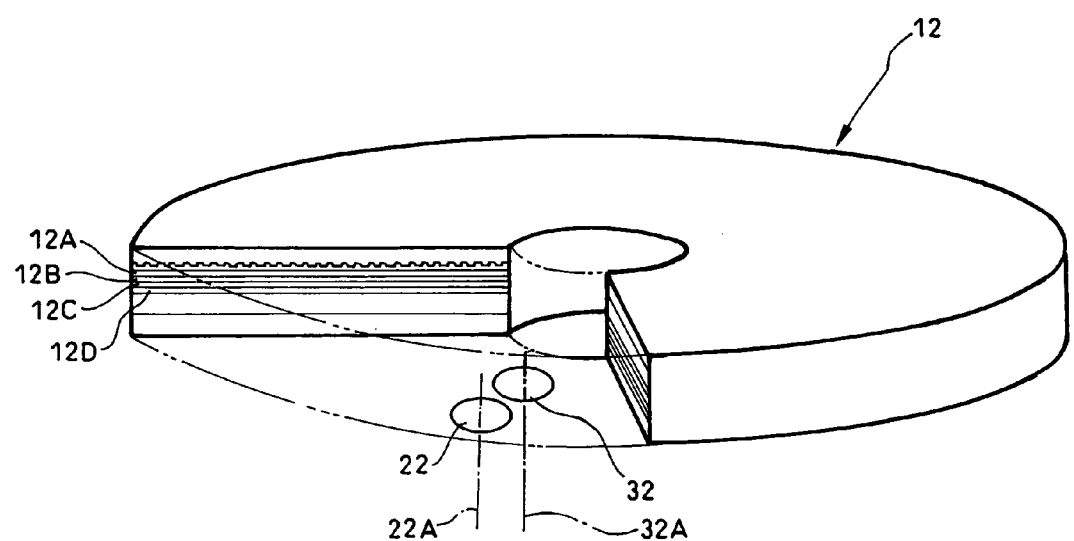
FIG. 2 is a partially sectional schematic perspective view illustrating the relationship between the multi-layered optical recording medium and the optical head device according to the exemplary embodiment.

As shown in FIG. 2, the multi-layered optical recording medium 12 is configured to include a plurality of recording layers 12A, 12B, 12C, 12D, and so forth.

Figure 3:
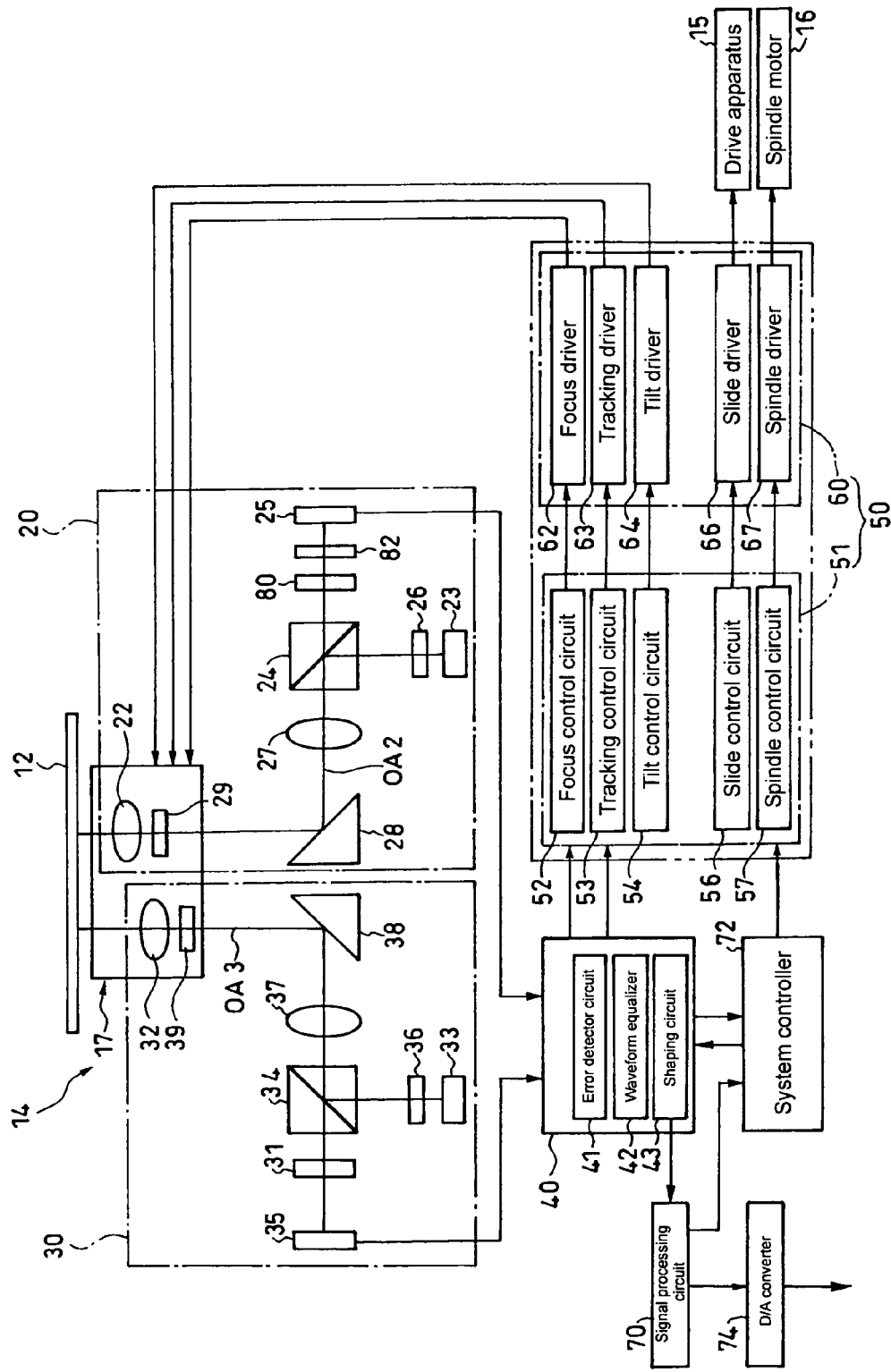
FIG. 3 is a block diagram illustrating an optical system and a circuit of the optical head device according to the exemplary embodiment.

As shown in FIG. 3, the optical head 14 includes a BD optical system 20, a DVD/CD optical system 30, and an actuator 17.

As shown in FIG. 2, the actuator 17 is provided with a BD objective lens 22 for the BD optical system 20 and a DVD/CD objective lens 32 for the DVD/CD optical system 30 in a manner such that their respective optical center axes 22A and 32A are aligned with each other at the same radial position orthogonal to the rotational direction of the multi-layered optical recording medium 12.

The BD optical system 20 is configured to include, on the same optical axis OA2, a laser light source 23 including a laser diode for emitting a laser beam for Blu-ray Discs (trade mark); a polarizing beam splitter 24 for reflecting, sideward in FIG. 3, either the s-polarization or p-polarization of a light beam emitted from the laser light source 23; the aforementioned BD objective lens 22 for focusing the light beam having passed through the polarizing beam splitter 24 at a particular recording layer of the multi-layered optical recording medium 12; and a photodetector 25 for receiving a reflected beam of the aforementioned light beam from the multi-layered optical recording medium 12 after having passed through the polarizing beam splitter 24 via the BD objective lens 22.

On the optical axis OA2, a diffraction grating 26 is disposed between the laser light source 23 and the polarizing beam splitter 24; a collimator lens 27, an upturn mirror 28, and a λ/4 wavelength plate 29 are disposed in that order between the polarizing beam splitter 24 and the reproduction objective lens 22; a sensor lens 80 or an astigmatic optical element is disposed between the polarizing beam splitter 24 and the photodetector 25. There is disposed a shield plate 82 between the sensor lens 80 and the photodetector 25.

The collimator lens 27 is movable in the direction of the optical axis by a drive apparatus (not shown). The sensor lens 80 is configured to provide predetermined astigmatism to a light beam that has passed therethrough. The astigmatism is used to detect a focus error signal (FE signal) (as will be described in more detail below).

For example, the actuator 17 is designed to include a voice coil motor and perform a focus operation, a tracking operation, and a tilt operation based on a signal from the controller 50.

The diffraction grating 26 is configured to split a light beam emitted from the laser light source 23 as a linearly polarized diverging beam into one main light beam and two sub light beams (hereinafter, these beams will be collectively referred to as a light beam unless otherwise explicitly stated). The aforementioned two sub light beams are used to detect a track error signal (TE signal) according to the differential push-pull scheme (hereinafter referred to as the DPP scheme).

Figure 4:
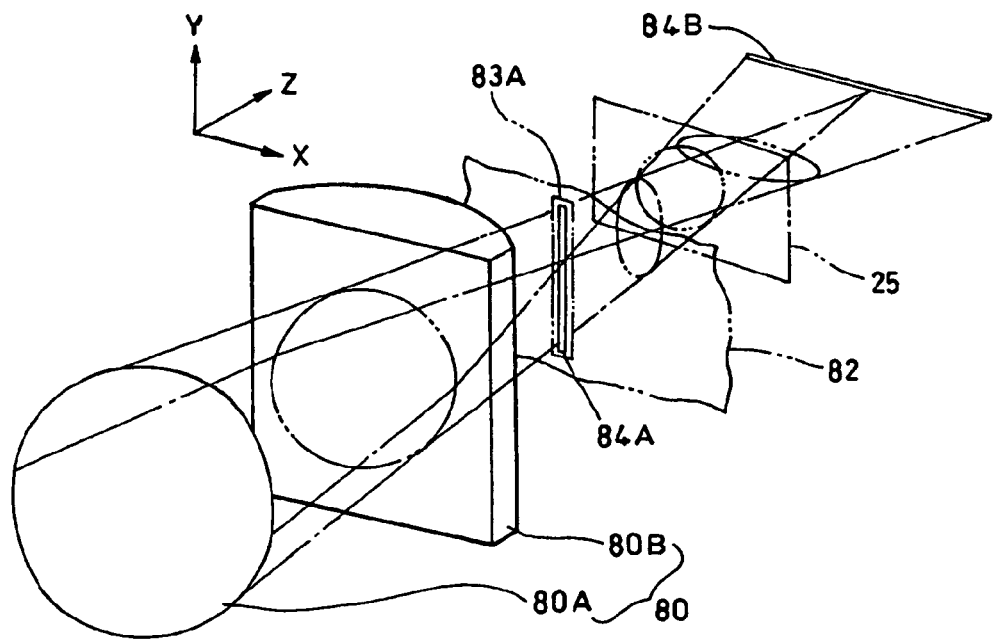
FIG. 4 is a perspective view schematically illustrating the principle of an astigmatic mechanism used in the exemplary embodiment.

The sensor lens 80 is configured, as shown in FIG. 4 illustrating the principle involved, to produce astigmatism in an incident reflected light beam, in combination of a circular lens 80A with a cylindrical lens 80B.

A description will now be made to the principle of production of astigmatism. Here, it is assumed that the optical axis of a reflected light beam is in the Z direction, with one direction within the plane orthogonal thereto being the X direction and the direction orthogonal to the X direction being the Y direction.

The sensor lens 80 is configured to produce astigmatism as follows by allowing the reflected light beam after having passed through the polarizing beam splitter 24 to go through the circular lens 80A and the cylindrical lens 80B. That is, the reflected light beam is linearly focused in the Y direction on a front focal line 84A or one linear focus closer to the cylindrical lens 80B, while being also linearly focused in the X direction on a rear focal line 84B or the other linear focus farther away therefrom. The photodetector 25 is located so that the light beam is circular.

Figure 5:
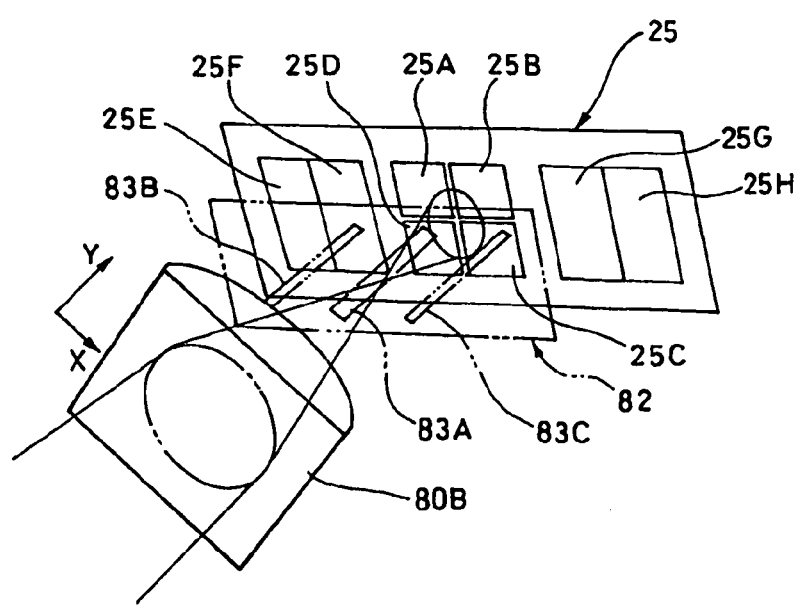
FIG. 5 is a perspective view schematically illustrating the relationship between a sensor lens, a shield plate, and a photodetector according to the exemplary embodiment.
Figure 6:
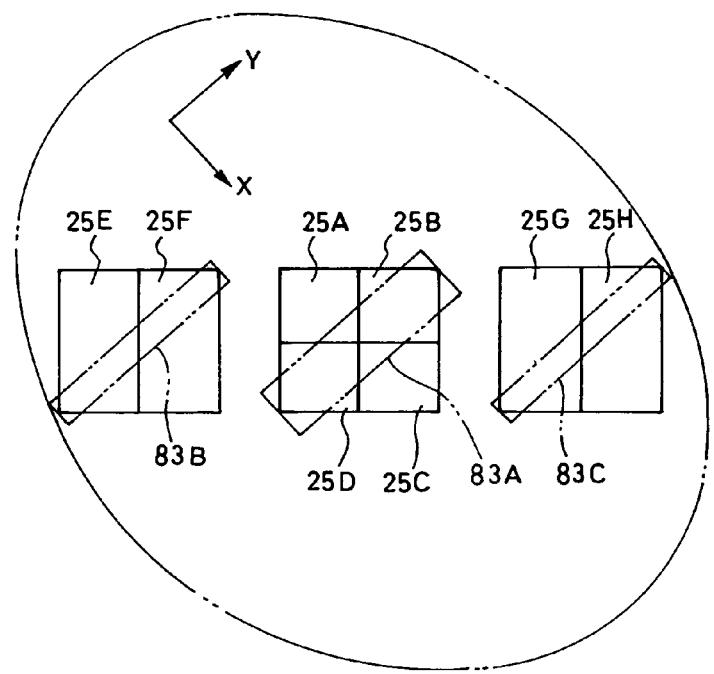
FIG. 6 is a plan view illustrating the relationship between the arrangement of light-receiving elements of a photodetector and the coverage of stray light according to the exemplary embodiment.

As shown in FIGS. 5 and 6, the shield plate 82 includes a window portion 83 which is disposed at the position of the aforementioned front focal line 84A and is slightly larger than the outer shape of the reflected light beam that forms the front focal line. The window portion 83 shields both the outer sides thereof in the direction of width orthogonal to the longitudinal direction on the cross section of the reflected light beam. The window portion 83 includes a main window 83A, and sub windows 83B and 83C, which are provided on both sides thereof.

The front focal line 84A is located at a distance s from the light-receiving face of the photodetector 25 in the direction of the sensor lens 80 which is an astigmatic optical element. The distance s is found by s being approximately equal to $d \times M^2$, where d is the peak-to-peak distance along an S-shaped curve that is obtained from the relationship between the FE signal obtained by allowing the reflected light beam to be incident on the photodetector 25 (see FIG. 13) and the focal distance of the BD objective lens 22; and M is the return path magnification of the optical system from the objective lens 22 to the sensor lens 80.

Note that in this exemplary embodiment, as shown in FIG. 5, the axis of the cylindrical lens 80B is tilted at an angle of 45 degrees in the clockwise direction with respect to that in FIG. 4 (illustrating the principle).

Here, the window portion is an optical opening for limiting the width through which light passes. The opening may be an optically opaque metal plate or resin plate, or a hole machined through a glass plate or the like. Alternatively, a glass plate may be etched to restrict the width which light passes through by providing a higher transmittance to a portion corresponding to the opening and a lower transmittance to the remaining portion.

The main window 83A corresponds to the one main light beam into which the light beam from the laser light source 23 is split through the diffraction grating 26. The sub windows 83B and 83C correspond to the two sub light beams that are split at the same time.

Accordingly, the main light beam has its front focal line 84A formed on the optical axis OA2, while the sub light beams have their front focal lines formed on both sides of the front focal line 84A of the main light beam in parallel thereto.

Figure 7:
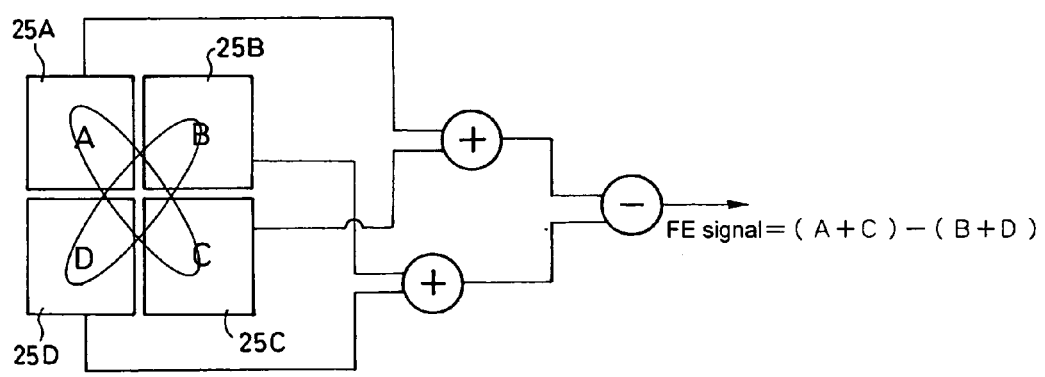
FIG. 7 is a circuit diagram illustrating a circuit for outputting a focus error signal according to the exemplary embodiment.

The photodetector 25 includes four light-receiving elements 25A to 25D of the same shape which are disposed respectively in four blocks adjacent to each other to be symmetrical vertically and horizontally, where the vertical direction is at 45 degrees to the X direction and the Y direction. As shown in FIG. 7, the photodetector 25 is configured to output, as a detection signal, the difference between the respective sums of outputs from the diagonal pairs of the light-receiving elements 25A to 25D, i.e., the pair of 25A and 25C and the pair of 25B and 25D.

The main window 83A is disposed so that its longitudinal direction coincides with the Y direction.

On both sides of the light-receiving elements 25A to 25D, there are disposed a first sub light beam receiver and a second sub light beam receiver, respectively. The first sub light beam receiver includes two light-receiving elements 25E and 25F of the same shape which are disposed side by side, and the second sub light beam receiver includes two light-receiving elements 25G and 25H of the same shape which are disposed side by side in two adjacent sections. The sub light beam receivers may also be of a type that has four light-receiving elements disposed in four sections adjacent to each other and symmetrical vertically and horizontally.

The opening width in the direction orthogonal to the longitudinal direction of the main window 83A and the sub windows 83B and 83C is determined as follows. Measurements are made on the optical strength of the reflected light beam and sub light beams at their respective front focal lines in relation to the position in the direction of opening width. Then, the opening width is determined to be 1.5 to 10 D where D is the beam width at $1/e^2$ of the peak value of the relative radiation optical strength distribution curve (see FIG. 8) that represents the relationship between the measured optical strength and the position in the direction of the opening width. Note that according to a common definition, $1/e^2=0.135$, and the beam diameter is the beam size at which the light beam strength is $1/e^2$ of the peak value. An opening width below 1.5 D allows the slit to shield too much light to successfully effect optical detections due to the lack of absolute quantity of light. In contrast, an opening width over 10 D fails to shield a sufficient amount of stray light and cause degradation in N/S. The inventor has found that at the front focal line position, the inter-layer stray light extended outwardly from 10 D in the direction of width, and shielding the inter-layer stray light outside 10 D has great effects as countermeasures against stray light.

According to the optical conditions of this exemplary embodiment, the opening width of the main window 83A is 50 μm or greater, and the opening width of the sub windows 83B and 83C is 10 μm or greater. These values are found effective for shielding stray light without causing any trouble in effecting focus servo, and thus preferably opening widths should be as close to 50 μm and 10 μm as possible.

The DVD/CD optical system 30 is configured in the same manner as the aforementioned BD optical system 20. Between a laser light source 33 and the DVD/CD objective lens 32 on the same optical axis OA3, the DVD/CD optical system 30 includes a diffraction grating 36, a polarizing beam splitter 34, a collimator lens 37, an upturn mirror 38, and a λ/4 wavelength plate 39 in that order. The DVD/CD optical system 30 also includes a second photodetector 35 for receiving a reflected beam from the multi-layered optical recording medium 12 after the light beam has returned to the polarizing beam splitter 34 and passed therethrough. There is also disposed a sensor lens 31 between the second photodetector 35 and the polarizing beam splitter 34. Note that the DVD/CD optical system 30 requires no shield plate.

In FIG. 5, the shield plate 82 and the photodetector 25 are spaced apart from each other in the direction of the optical axis. However, the present invention is not limited to this configuration; in actual mass production, the photodetector 25 and the shield plate 82 may be well integrated with each other.

Figure 9:
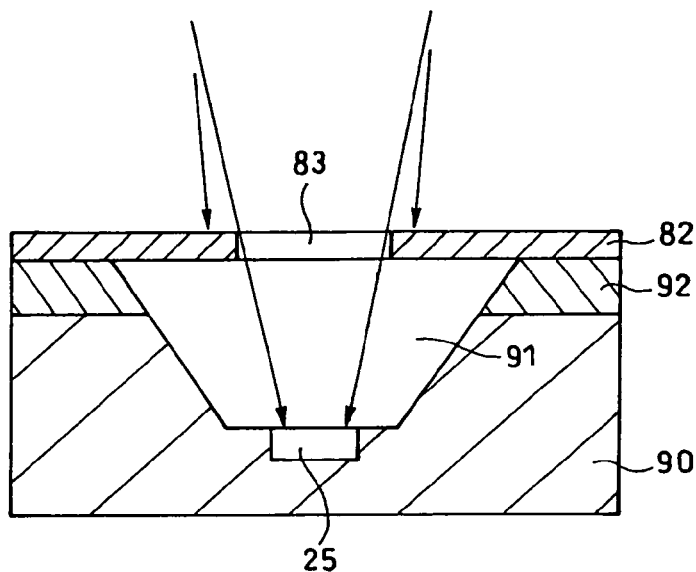
FIG. 9 is a cross-sectional view illustrating an example of a photodetector and a shield plate integrated with each other.

For example, as shown in FIG. 9, a bowl-shaped recessed portion 91 may be formed in a substrate 90 to install the photodetector 25 at the bottom of the recessed portion 91. Then, the shield plate 82 may be adhered to the substrate 90, for example, using an adhesive 92 so as to cover the entire surface of the bowl-shaped recessed portion 91.

In this case, as described above, the distance between the photodetector 25 and the window portion 83 is 0.478 mm, thereby making the substrate 90 extremely small. The shield plate 82 may be, for example, a matte black finish metal plate.

The detector circuit 40 includes an error detector circuit 41, a waveform equalizer 42, and a shaping circuit 43. The controller 50 includes a control circuit 51 and a driver 61.

The control circuit 51 includes a focus control circuit 52, a tracking control circuit 53, a tilt control circuit 54, a slide control circuit 56, and a spindle control circuit 57.

The driver 61 includes a focus driver 62, a tracking driver 63, a tilt driver 64, a slide driver 66, and a spindle driver 67.

The controller 50 is configured as mentioned above to provide focus servo, tracking servo, and slide servo for the optical head 14 based on a focus error (FE) signal and a tracking error (TE) signal from the detector circuit 40 as well as to control the rotation of a spindle motor 72.

The signal processing circuit 70 is designed to perform digital signal processing such as demodulation or error detection/correction on the RF signal from the detector circuit 40 to read data, and then convert the data signal from digital to analog via the D/A converter 74 for supplying to the output terminal (not shown).

A description will now be made to the process in which the multi-layered optical recording medium 12 compliant with the Blu-ray standards is irradiated with a light beam from the aforementioned BD optical system 20 to obtain a reproduction signal.

The laser light source 23 emits a linearly polarized light beam as diverging light, which is then incident upon the diffraction grating 26 and split into one main light beam and two sub light beams as described above.

The light beam having passed through the diffraction grating 26 is reflected at the polarizing beam splitter 24, and then changed through the collimator lens 27 into a generally parallel light beam.

After having passed through the collimator lens 27, the light beam is reflected by the upturn mirror 28 towards the multi-layered optical recording medium 12, and then converted from linear polarization to circular polarization through the λ/4 wavelength plate 29 to be focused on the intended recording layer of the multi-layered optical recording medium 12 via the BD objective lens 22.

The light beam is reflected on the recording layer, so that the reflected light beam is incident upon the BD objective lens 22 and then converted to a linearly polarized beam through the λ/4 wavelength plate 29. Then, the light beam is allowed to be incident on the polarizing beam splitter 24 via the upturn mirror 28 and the collimator lens 27. The reflected beam (light beam) transmits the polarizing beam splitter 24 to be incident on the photodetector 25 via the sensor lens 80 and the window portion 83 of the shield plate 82. Based on the incident light beam, the photodetector 25 outputs the reproduction (RF) signal to the detector circuit 40.

The detector circuit 40 outputs an RF signal to the signal processing circuit 70 via the waveform equalizer 42 and the shaping circuit 43. The signal processing circuit 70 performs digital signal processing such as demodulation, and error detection/correction on the RF signal, which is then sent to the D/A converter 74, where the data signal is converted from digital to analog to be supplied to the output terminal.

Note that as in the BD optical system 20, the DVD/CD optical system 30 also records and reads in the same manner except that the operations are performed on DVDs or CDs.

A description will now be made in detail to the process in which the aforementioned reflected light beam transmits the polarizing beam splitter 24 and is incident on the photodetector 25 via the sensor lens 80 and the shield plate 82 to be detected as a reproduction signal.

The light beam having passed through the sensor lens 80 produces astigmatism by the sensor lens 80.

As described above, the reflected light beam is to be linearly focused in the Y direction at the front focal line 84A or a linear focus that is located closer the cylindrical lens 80B, while being also linearly focused in the X direction at the rear focal line or a linear focus located farther away therefrom (see the symbol 84B of FIG. 4). Since the photodetector 25 is located so as to have a circular reflected light beam, equal outputs from the respective light-receiving elements 25A to 25D will show that the reflected light beam has been brought into focus on the intended recording layer. Any focal shift in a particular direction would cause an increase or decrease in the output from the photodetector 25 and thereby form a so-called S-shaped curve, which in turn makes it possible to detect the focal point.

Here, the light beam will also be reflected on a recording layer, on which it has not been focused, and then incident on the photodetector 25. For example, the reflected light beam is incident on a region, such as the elliptical region indicated with a chain double-dashed line in FIG. 6, where the region is much larger than the light-receiving area of the photodetector 25. Conventionally, the beam incident on this area is turned to noise, thereby causing degradation in the quality of the reproduction signal.

In this exemplary embodiment, the window portion 83 is located at the front focal line 84A so as to shield stray light from the recording layer at an unfocused position as described above. More specifically, at the main window 83A, the reflected light beam from the recording layer located at its focal position is allowed to pass through the inside of the main window 83A, as shown as principal light 85A in FIG. 10, while allowing the shield plate 82 outside the main window 83A to shield stray light 85B other than the principal light 85A.

Figure 10:
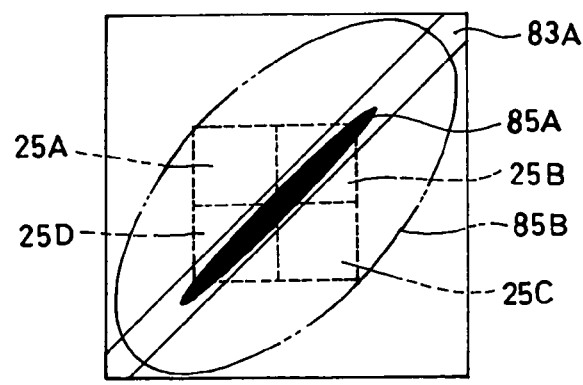
FIG. 10 is a schematic plan view illustrating the relationship between the main window and the beam shapes of principal light and stray light at the front focal line position according to the exemplary embodiment.

Note that a reflected light beam from the recording layer located at an unfocused position, like the stray light 85B as illustrated with a chain double-dashed line in FIG. 10, has, at the front focal line 84A, a beam shape and size such that well contains the main window 83A and even the light-receiving elements 25A to 25D of the photodetector 25.

Figure 11:
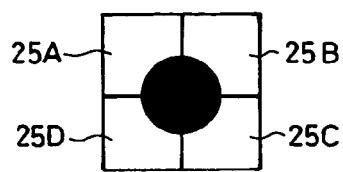
FIG. 11 is a plan view illustrating the principal light focused on the photodetector.

As shown in FIG. 10, the aforementioned stray light 85B is mostly shielded outside both sides of the main window 83A. On the other hand, the stray light 85B falls outside the longitudinal sides of the light-receiving elements 25A to 25D, thus causing no noise. Accordingly, this configuration significantly reduces the ratio of the stray light 85B to the principal light 85A, thereby providing a drastically improved N/S for the reproduction signal. Note that the principal light 85A in focus reaches the photodetector 25 with its beam being circular in shape as shown in FIG. 11.

Figure 12:
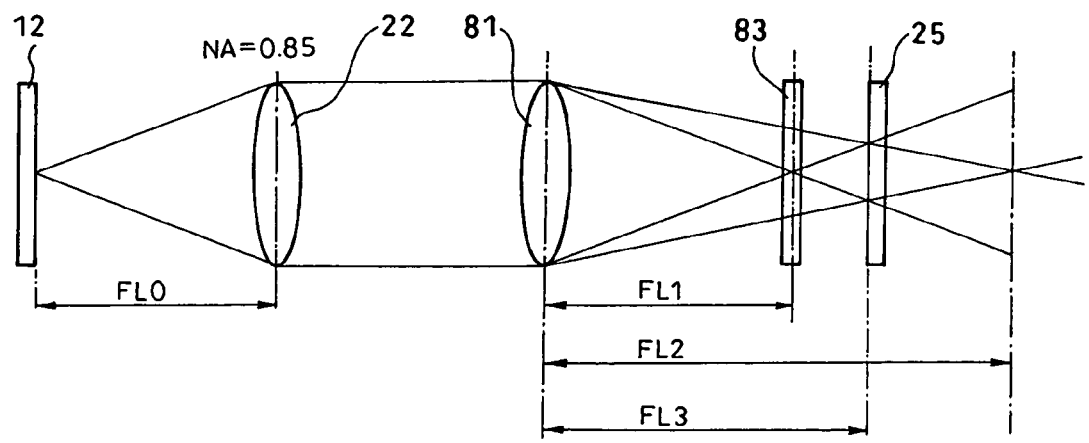
FIG. 12 is a view of an optical arrangement illustrating the positional relationship between the sensor lens, the window portion, and the photodetector.
Figure 13:
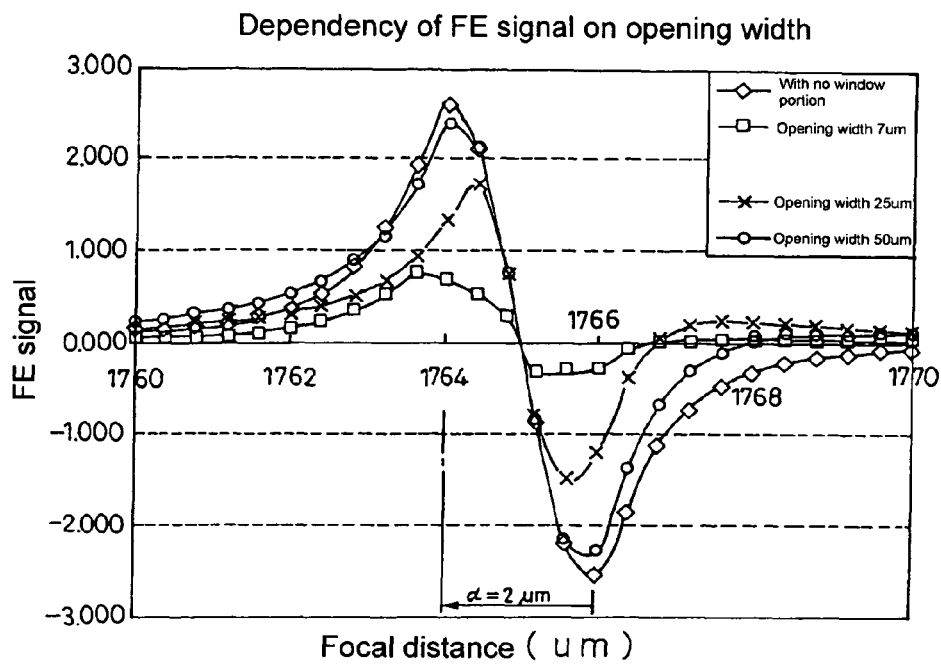
FIG. 13 is a graph illustrating the relationship between the FE signal and the focal distance according to the exemplary embodiment, in relation to the window width.
Figure 14:
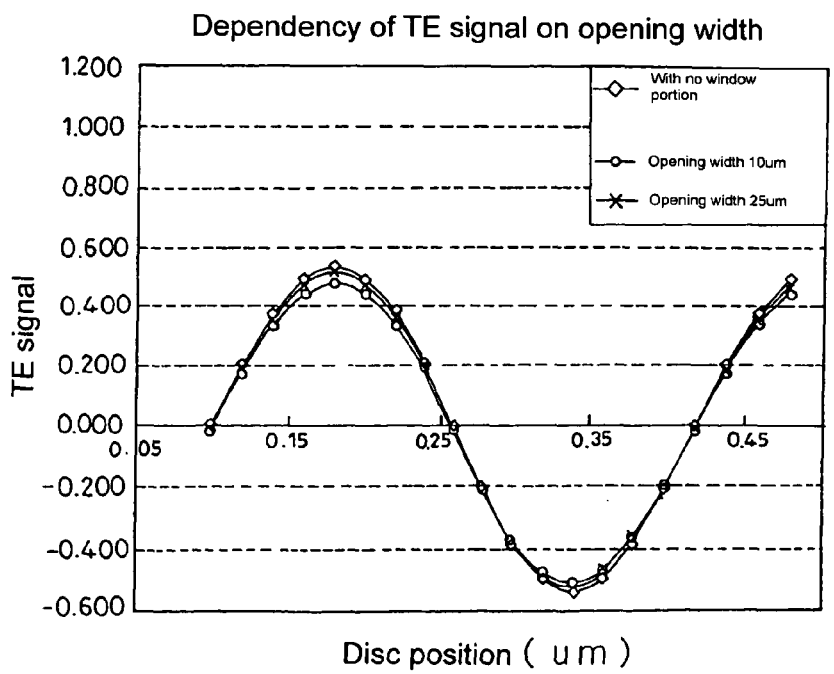
FIG. 14 is a graph illustrating the relationship between the TE signal, the disc position, and the window width according to the exemplary embodiment.

With reference to FIGS. 12 to 14, a description will now be presented to the reason why the aforementioned main window 83A was given a width of 50 μm or greater and the sub windows 83B and 83C were provided with a width of 10 μm or greater.

FIG. 12 is a schematic view showing an optical system in which the multi-layered optical recording mediums 12, the BD objective lens 22, the sensor lens 80, the shield plate 82, and the photodetector 25 are disposed on a linear optical axis.

In FIG. 12, FL0 is the distance between a recording layer of the multi-layered optical recording medium 12 and the BD objective lens 22, and FL1, FL2, and FL3 show the respective distances between the sensor lens 80 and the shield plate 82, the rear focal line 84B, and the photodetector 25. Here, to comply with the optical head specifications for the Blu-ray Disc, the BD objective lens is given a numerical aperture NA=0.85, and the laser beam in use is a wavelength of 405 nm. Then, the four light-receiving elements 25A to 25D that constitute the photodetector 25 are each 50 μm×50 μm in size, with FL0 =1.765 mm, FL1=25.5 mm, FL2=26.475 mm, and FL3=25.978 mm. The distance s from the light-receiving face of the photodetector 25 to the window portion 83 is determined so that FL3−FL1=0.478 mm.

This distance s is approximately equal to $d \times M^2$=480.5 μm that is calculated from the peak-to-peak distance d=2 μm on the FE signal curve of FIG. 13 and the return path magnification of the objective lens M=15.5. That is, s is approximately equal to $d \times M^2$.

With the aforementioned configuration, the FE signal and the dependency of the FE signal on the window portion width have been discussed.

In FIG. 13, the vertical axis represents the FE signal and the horizontal axis indicates the distance (focal distance) between the BD objective lens 22 and a recording layer. The relationship between the FE signal and the focal distance was determined with no shield plate and for each of the window portion widths of 7 μm, 25 μm, and 50 μm.

Furthermore, as shown in FIG. 14, to find the relationship to the dependency of the TE signal on the opening width (sub window), the relationship between the TE signal and the disc position with no shield plate and for each of the window portion widths of 10 μm and 25 μm.

Figure 8:
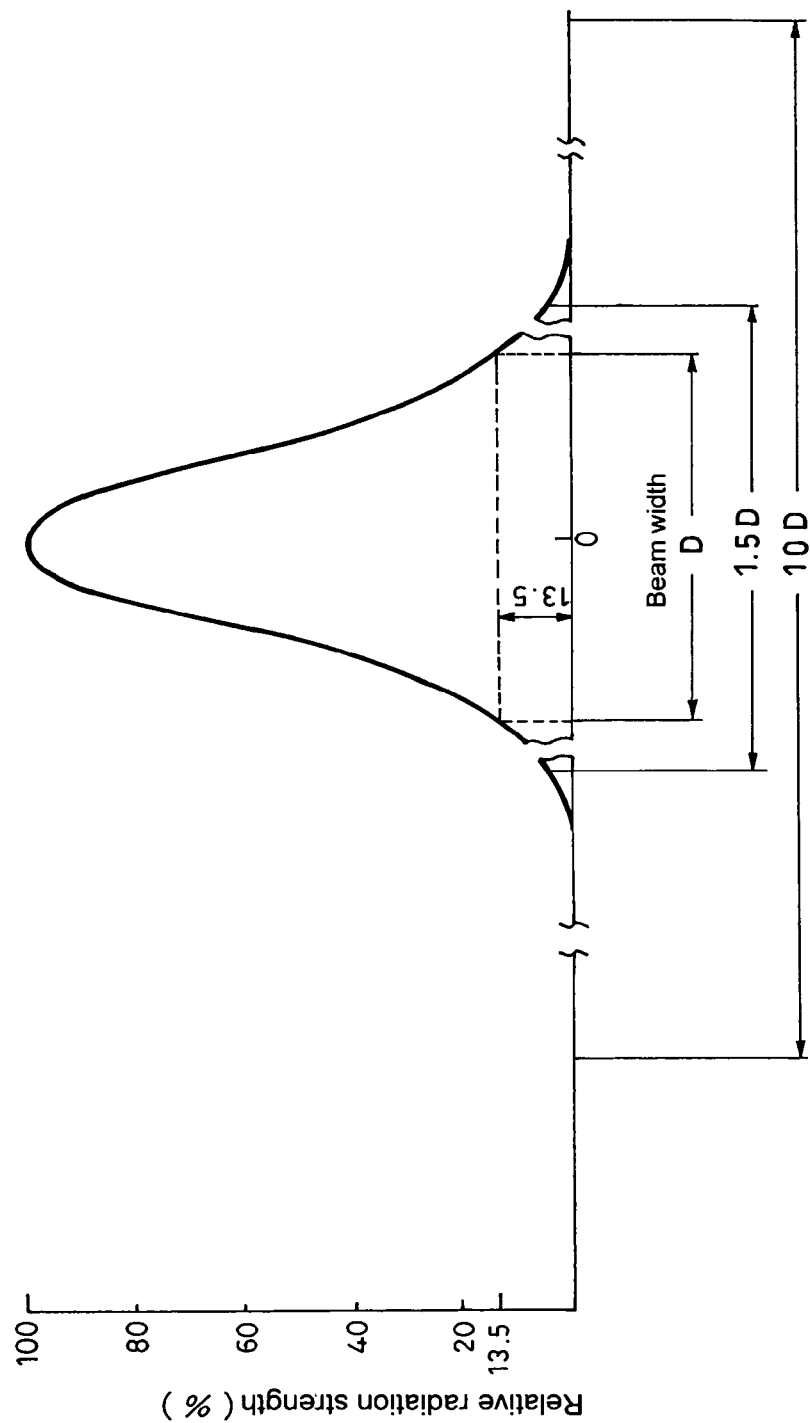
FIG. 8 is a graph illustrating the relationship between the position in the direction of width and the relative radiation strength of a reflected light beam at a front focal line position.

As a result, it was found that for the FE signal, an opening width of 50 μm or greater provides generally the same S-shaped curve amplitude of the light beam in focus as with no shield plate, allowing for effecting focus servo without any trouble. On the other hand, it was also found that for the TE signal, the light beam in focus with the sub window having a width of 10 μm or greater has the same characteristics as with no shield plate, thus never being influenced by the window portion. At this time, the stray light has generally the same width as that of the window portion when arriving at the light-receiving portion. It is thus possible to shield the stray light with the opening width set to the aforementioned size and to prevent the opening width from having an effect on the light beam in focus. This result agrees with the 1.5 D to 10 D on the relative radiation strength curve at the front focal line as shown in FIG. 8.

Figure 15:
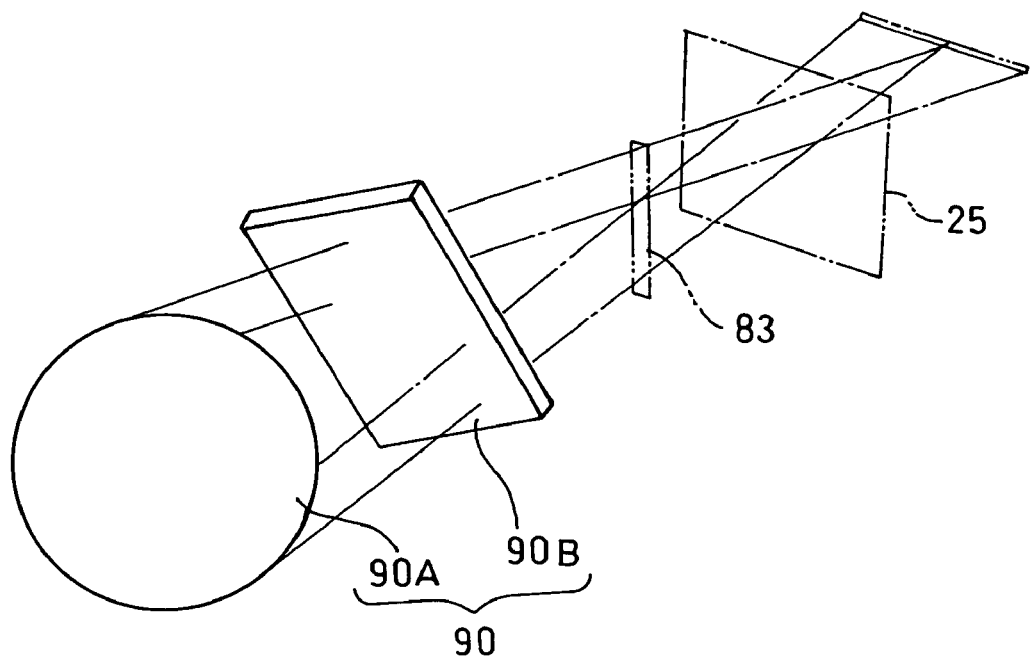
FIG. 15 is a schematic perspective view illustrating another exemplary astigmatic optical element.

Note that in this exemplary embodiment, the sensor lens 80 provides astigmatism. However, for example, as shown in FIG. 15, it is also possible to employ an optical element 90 in which a circular lens 90A and a parallel-plane glass plate 90B are arranged so that the parallel plane is tilted with respect to the optical axis of a reflected light beam.

In the present invention, a shield plate is disposed between an astigmatic optical element and a photodetector for detecting focus error, at the position of the front focal line of a reflected light beam provided by the astigmatic optical element so as to shield light at a position spaced apart outwardly from the focal line. This configuration allows for easily adjusting the position of the shield plate and shielding the reflected light beam (inter-layer stray light) from a recording layer at an unfocused position without making the device larger in size or increasing the number of parts used.

What is claimed is:

1. An optical head device, comprising:
a laser light source for producing a light beam;
an objective lens for focusing the light beam from the laser light source on an optical recording medium and for receiving its reflected beam or a reflected light beam;
an astigmatic optical element for causing the reflected light beam having passed through the objective lens to have astigmatism and thereby focus along a line in a Y direction at a near front focal line position and along a line in an X direction at a far rear focal line position, the reflected light beam having an optical axis in a Z direction, the X direction and the Y direction being orthogonal to each other in a plane perpendicular to the Z direction; and
a photodetector for detecting a focus position of the objective lens from a shape of the reflected light beam, the photodetector being disposed between the front focal line position and the rear focal line position, wherein
a shield plate for shielding both outer sides in a direction of width orthogonal to a longitudinal direction on a cross section of the reflected light beam at the front focal line position is disposed at the front focal line position.

2. The optical head device according to claim 1, wherein the shield plate is designed to shield both outer sides at most 10D in the direction of width, where D is a beam width or 1/e2 of a peak value of a relative radiation strength distribution curve which shows a relationship between an optical strength and a position in the direction of width orthogonal to the longitudinal direction on the cross section of the reflected light beam at the front focal line position.

3. The optical head device according to claim 1, wherein the front focal line is located at distance s from a light-receiving face of the photodetector towards the astigmatic optical element, and s is approximately equal to d×M2, where d is a peak-to-peak distance of an S-shaped curve obtained by a relationship between a focus error signal provided by allowing the reflected light beam to be incident on the photodetector and a focal distance of the objective lens, and M is a return path magnification of an optical system from the objective lens to the light-receiving face of the photodetector.

4. The optical head device according to claim 1, wherein:
the shield plate has a window portion through which a reflected light beam passes, the window portion being elongated in the longitudinal direction on the cross section of the reflected light beam at the front focal line position; and
the photodetector has four light-receiving elements of the same shape disposed to be symmetrical vertically and horizontally, where the vertical direction is defined to be at 45 degrees to the X direction and the Y direction, the photodetector being designed to output, as a detection signal, a difference between respective sums of outputs from two diagonal pairs of these light-receiving elements, and the window portion is disposed to have a longitudinal direction thereof aligned with the Y direction.

5. The optical head device according to claim 1, wherein:
further comprising a diffraction grating which is configured to split the light beam emitted from the laser light source as a diverging beam into one main light beam and two sub light beams,
the photodetector has a main light beam receiver and two sub light beam receivers disposed equidistantly in the X direction and Y direction with respect to the main light beam receiver;
the main light beam receiver includes light-receiving elements disposed in four sections adjacent vertically and horizontally, where the vertical direction is at 45. degrees to the X direction and the Y direction, the main light beam receiver being configured to output, as a detection signal, a difference between respective sums of outputs from two diagonal pairs of light-receiving elements;
the sub light beam receiver has light-receiving elements disposed either in four sections adjacent to each other vertically and horizontally or two sections adjacent to each other vertically;
the shield plate has a window portion through which a reflected light beam passes, the window portion being elongated in the longitudinal direction on the cross section of the reflected light beam at the front focal line position;
the window portion includes a main window and sub windows; and
the main window is disposed to have a longitudinal direction thereof aligned with the Y direction, the sub windows being disposed at the front focal line positions of the sub light beams in parallel to the main window.

6. The optical head device according to claim 5, wherein a width in a direction orthogonal to the longitudinal direction of the main window is greater than a width of the sub window.

7. An optical recoding and reading system comprising: an optical recording medium including a plurality of recording layers; and the optical head device according to claim 1, wherein the optical head device allows the objective lens to effect focusing on the recording layer based on an output signal from the photodetector.

8. An optical recoding and reading system comprising: an optical recording medium including a plurality of recording layers; and the optical head device according to claim 2, wherein the optical head device allows the objective lens to effect focusing on the recording layer based on an output signal from the photodetector.

9. An optical recoding and reading system comprising: an optical recording medium including a plurality of recording layers; and the optical head device according to claim 3, wherein the optical head device allows the objective lens to effect focusing on the recording layer based on an output signal from the photodetector.

10. An optical recoding and reading system comprising: an optical recording medium including a plurality of recording layers; and the optical head device according to claim 4, wherein the optical head device allows the objective lens to effect focusing on the recording layer based on an output signal from the photodetector.

11. An optical recoding and reading system comprising: an optical recording medium including a plurality of recording layers; and the optical head device according to claim 5, wherein the optical head device allows the objective lens to effect focusing on the recording layer based on an output signal from the photodetector.

12. An optical recoding and reading system comprising: an optical recording medium including a plurality of recording layers; and the optical head device according to claim 6, wherein the optical head device allows the objective lens to effect focusing on the recording layer based on an output signal from the photodetector.

* * * * *